(12) United States Patent
Ducksbury et al.

(10) Patent No.: US 8,265,370 B2
(45) Date of Patent: Sep. 11, 2012

(54) AUTOMATED SELECTION OF IMAGE REGIONS

(75) Inventors: Paul Gerard Ducksbury, Worcestershire (GB); Margaret Jai Varga, Worcestershire (GB)

(73) Assignee: Qinetiq Limited (GB)

( * ) Notice: Subject to any disclaimer, the term of this patent is extended or adjusted under 35 U.S.C. 154(b) by 1156 days.

(21) Appl. No.: 12/065,793

(22) PCT Filed: Sep. 4, 2006

(86) PCT No.: PCT/GB2006/003247
§ 371 (c)(1),
(2), (4) Date: Mar. 5, 2008

(87) PCT Pub. No.: WO2007/028963
PCT Pub. Date: Mar. 15, 2007

(65) Prior Publication Data
US 2008/0273787 A1   Nov. 6, 2008

(30) Foreign Application Priority Data
Sep. 9, 2005 (GB) .................................. 0518367.8

(51) Int. Cl.
*G06K 9/00* (2006.01)
(52) U.S. Cl. ........................................ 382/133; 382/173
(58) Field of Classification Search .................. 382/133, 382/173
See application file for complete search history.

(56) References Cited

U.S. PATENT DOCUMENTS

| 5,204,625 A | * | 4/1993 | Cline et al. ..................... 324/306 |
| 5,671,290 A | * | 9/1997 | Vaidyanathan ............... 382/133 |
| 5,939,278 A | * | 8/1999 | Boon et al. .................... 435/7.23 |
| 5,978,497 A | * | 11/1999 | Lee et al. ....................... 382/133 |
| 6,031,930 A | * | 2/2000 | Bacus et al. .................... 382/133 |
| 6,055,330 A | * | 4/2000 | Eleftheriadis et al. ........ 382/154 |

(Continued)

FOREIGN PATENT DOCUMENTS

GB   2395263 A  *  5/2004

(Continued)

OTHER PUBLICATIONS

Haralick, Robert et al., "Textural Features for Image Classification", Nov. 1973, "IEEE Transactions on Systems, Man and Cybernetics", vol. SMC-3 No. 6, p. 610-621.*

(Continued)

*Primary Examiner* — Jason M Repko
*Assistant Examiner* — Gandhi Thirugnanam
(74) *Attorney, Agent, or Firm* — McDonnell Boehnen Hulbert & Berghoff LLP

(57) ABSTRACT

A method for automated selection of image regions ("tiles") in an overall image includes computing a gray-level co-occurrence matrix and entropy of a green plane of the overall image, applying morphological closing to the matrix and thresholding the matrix and entropy image to provide binary masks. The matrix and entropy masks are combined with a vignette mask, the combination indicating areas of acceptable tissue from which tiles are selected randomly. For cancer grading; image data is transformed to Hue, Saturation and Value; for steroid/protein expression analysis it is transformed to cyan and a Sobel of cyan is computed. A feature measure is computed for each tile based on color and texture, and is carried out randomly but influenced by feature measure. Finally, from the further selection, tiles are chosen which combine high feature measure with low overlap.

30 Claims, 3 Drawing Sheets

U.S. PATENT DOCUMENTS

| | | | | |
|---|---|---|---|---|
| 6,134,354 | A * | 10/2000 | Lee et al. | 382/270 |
| 6,137,899 | A * | 10/2000 | Lee et al. | 382/133 |
| 6,804,381 | B2 * | 10/2004 | Pang et al. | 382/111 |
| 6,858,007 | B1 * | 2/2005 | Akselrod et al. | 600/437 |
| 7,308,125 | B2 * | 12/2007 | Atkinson | 382/131 |
| 7,667,713 | B2 * | 2/2010 | Suino et al. | 345/600 |
| 7,907,769 | B2 * | 3/2011 | Sammak et al. | 382/133 |
| 7,949,474 | B2 * | 5/2011 | Callahan et al. | 702/19 |
| 2006/0002608 | A1 * | 1/2006 | Haddon et al. | 382/173 |
| 2006/0280364 | A1 * | 12/2006 | Ma et al. | 382/173 |
| 2009/0226060 | A1 * | 9/2009 | Gering et al. | 382/128 |
| 2010/0111396 | A1 * | 5/2010 | Boucheron | 382/133 |
| 2011/0026798 | A1 * | 2/2011 | Madabhushi et al. | 382/131 |
| 2012/0075440 | A1 * | 3/2012 | Ahuja et al. | 348/61 |
| 2012/0134582 | A1 * | 5/2012 | Treado et al. | 382/165 |

FOREIGN PATENT DOCUMENTS

| | | |
|---|---|---|
| GB | 2395263 | 6/2004 |
| GB | 2396406 A * | 6/2004 |
| WO | WO 96/18170 | 6/1996 |
| WO | WO 03/060653 | 7/2003 |
| WO | WO 2004/017052 | 2/2004 |
| WO | WO 2004/038633 | 5/2004 |
| WO | WO 2004/044845 | 5/2004 |
| WO | WO 2004/046994 | 6/2004 |
| WO | WO 2004/047004 | 6/2004 |
| WO | WO 2004/055733 | 7/2004 |
| WO | WO 2004/057513 | 7/2004 |
| WO | WO 2004/072900 | 8/2004 |
| WO | WO 2005/001438 | 1/2005 |

OTHER PUBLICATIONS

Clausi, David., "An analysis of co-occurrence texture statistics as a function of grey level quantization", 2002, Can J. Remote Sensing, vol. 28, No. 1 pp. 45-62.*

Haddon, J. et al., "Co-occurrence matrices for image analysis", Apr. 1993, Electronics & Communication Engineering Journal, p. 71-83.*

Denaro, et al. "Papnet Testing System, Technical Update", ACTA Cytologica, International Academy of Cytology, vol. 41, No. 1, pp. 65-73 (Jan. 1997).

Sinha, et al., "Automation of Differential Blood Count", IEEE Tencon 2003. Conferencer on Convergent Technologies for the Asia-Pacific Region. India, Oct. 15-17, 2003, vol. 4, conf. 18, pp. 547-551.

* cited by examiner

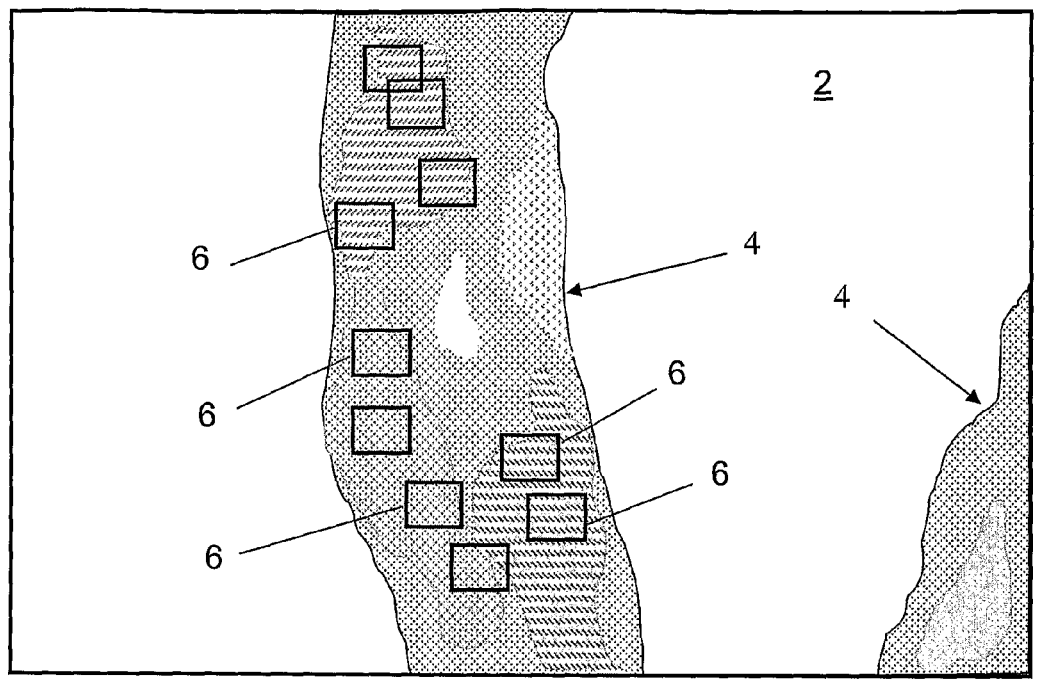
Figure 1 Selection of regions from highly textured sections of core biopsy
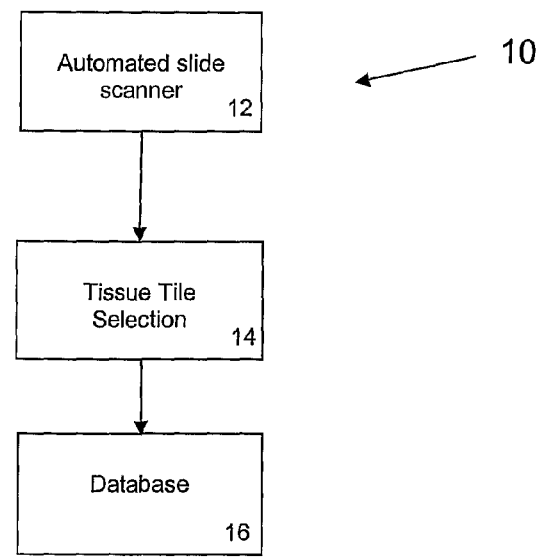
Figure 2

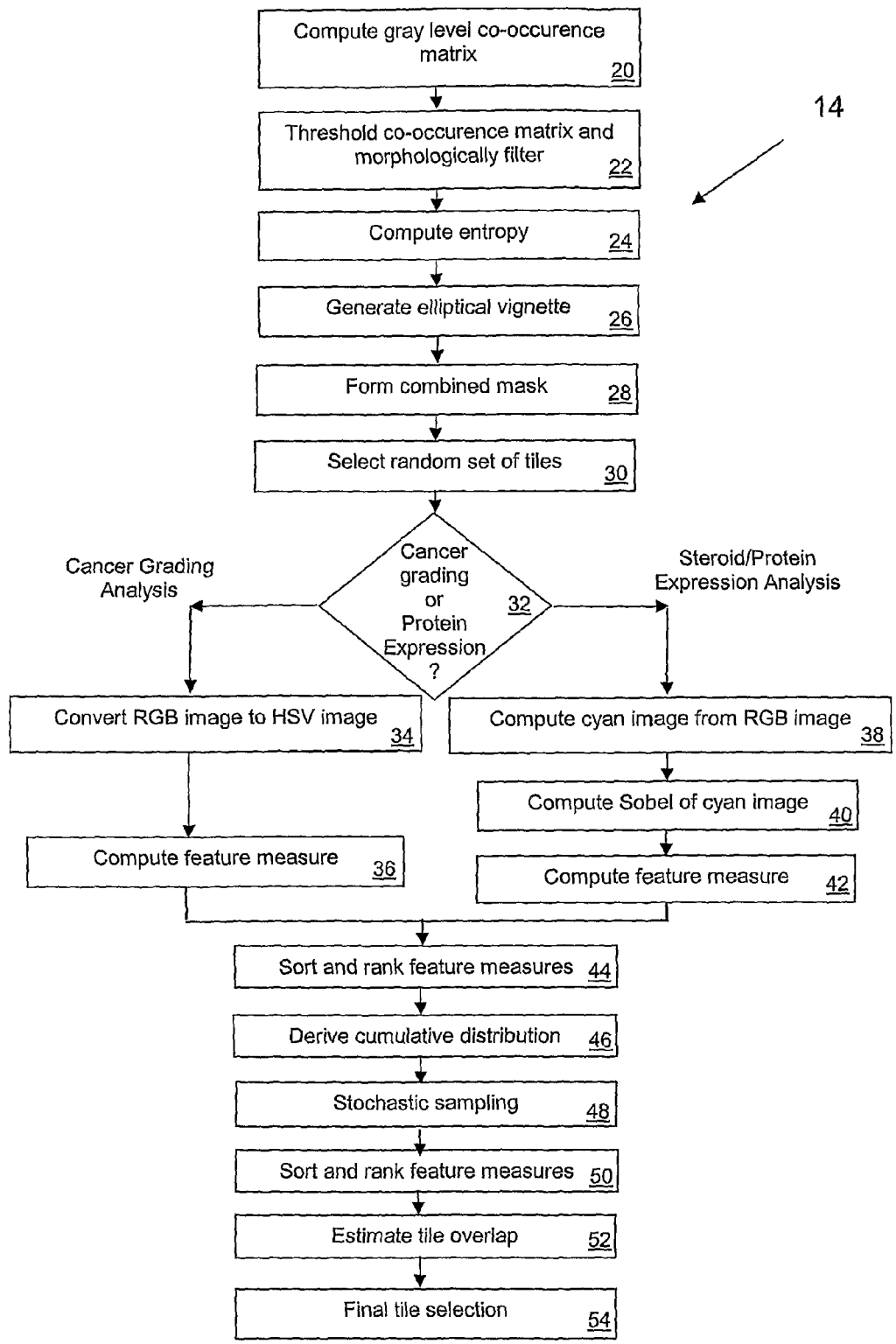
Figure 3 Tissue tile selection

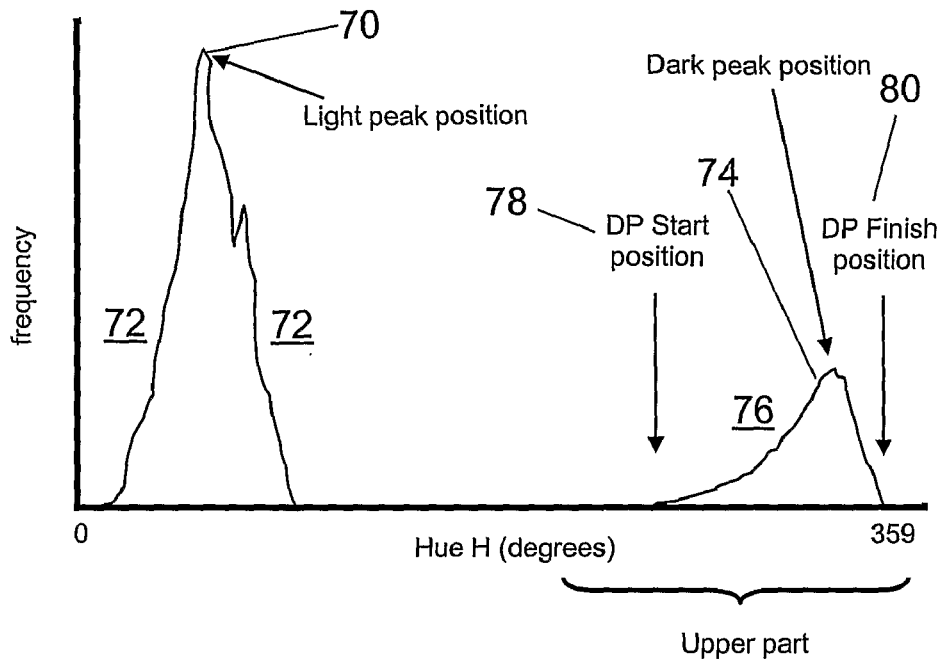
Figure 4 Hue histogram analysis
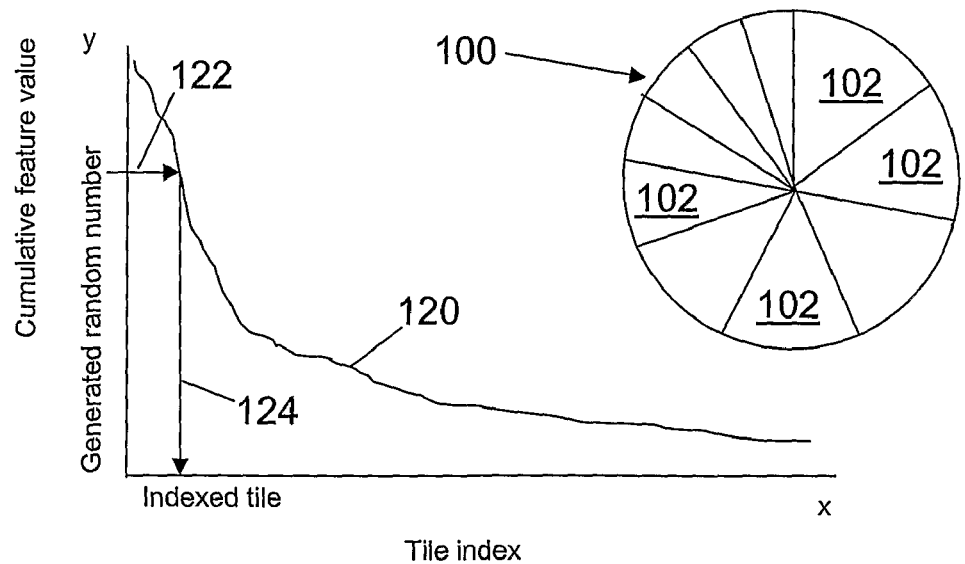
Figure 5 Stochastic selection

AUTOMATED SELECTION OF IMAGE REGIONS

BACKGROUND OF THE INVENTION (1) Field of the Invention

This invention relates to a method, an apparatus and a computer program for automated selection of image regions, and in particular (although not exclusively) for automated selection of regions of images of specimen tissue samples for histopathological assessment.

(2) Description of the Art

Selection of specimen tissue samples is an essential precursor to histopathological assessment of many forms cancer, anomalies or a patient's response. Once tissue samples have been selected, they may be assessed manually by a pathologist to determine parameters such as oestrogen and progesterone receptor (ER and PR) status, C-erb-2 and vascularity. C-erb-2 is also known as Cerb-B2, her-2, her-2/neu and erb-2. Automated histopathological assessment is also known: see e.g. published international patent applications WO 2004/017052, WO 2004/047004, WO 2004/046994, WO 2004/038633, WO 2004/057513, WO 2004/044845, WO 2004/055733 and WO 2004/072900.

Breast cancer in particular is a common form of female cancer requiring selection of tissue samples: once a lesion indicative of breast cancer has been detected, breast tissue samples are taken, chemically stained to bring out features of interest and assessed by a pathologist to establish a diagnosis, prognosis and treatment plan. Selection of tissue samples for assessment is however a time consuming manual process. It entails interpretation of colour images by human eye, which is highly subjective: a pathologist uses a microscope at low magnification to study a core biopsy specimen tissue sample on a microscope slide and identify parts of the slide which exhibit features suggesting that a parameter of interest is detectable. The objective is to identify regions (referred to as "tiles") of the microscope slide image which are potentially suitable for determination of a histological parameter. A slide viewed at 2.5× magnification (typical for selection) corresponds to a maximum of 256 tiles at 40× magnification (typical for assessment) assuming no tile overlap, and many of these tiles may be unsuitable. Assessment time is wasted if tiles are selected in which it turns out that the parameter of interest is not in fact reliably detectable. The selection process is characterised by considerable variation between tiles selected by different observers, and even those selected by the same observer at different times. Moreover, there is a shortage of pathology staff, so it is desirable to automate the tile selection process.

SUMMARY OF THE INVENTION

It is an object of the invention to provide an automated technique for specimen selection.

The present invention provides a method for automated selection of image regions ("tiles") in an overall image, the method comprising:
a) generating a computed image from at least one of a co-occurrence matrix of the overall image and an entropy image of the overall image, the computed image distinguishing between tiles on the basis of whether they are relatively more or relatively less likely to exhibit a property of interest;
b) selecting a prior subset of the tiles which are relatively more likely to exhibit the property of interest;
c) for tiles in the prior subset, deriving a feature measure associated with at least one of colour and texture; and
d) selecting from the prior subset a further subset of tiles at least partly on the basis of tile feature measures.

The invention provides the advantage that it forms an objective and reproducible automated technique for selection of tiles from an image of a tissue sample.

The step of selecting from the prior subset a further subset of tiles may have regard to avoidance of excessive tile overlap. The step of generating a computed image may use a combination of the co-occurrence matrix, the entropy image and a vignette mask arranged to exclude from the computed image outer regions of the overall image having low illumination relative to inner regions.

The step of generating a computed image may incorporate thresholding of the co-occurrence matrix and the entropy image to render them binary. The overall image may be a red, green and blue (R, G, B) image and the step of generating a computed image may be implemented using a green plane of the overall image.

A computed image may be generated using at least the co-occurrence matrix of the overall image and applying morphological closing operations to the computed image for spatial filtering of both tile regions containing image features of interest (foreground) and tile regions lacking such features (background).

Selection of prior and further subsets of tiles may be implemented by random procedures.

The method of the invention may be used for cancer grading: it may include applying a Hue/Saturation/value transformation to image data, thresholding Hue and Saturation components to obtain areas of 'light pink', 'dark pink' and 'white' tissue and computing a feature measure for each tile based on colour and texture.

The method of the invention may alternatively be used for steroid/protein expression analysis: it may include transforming image data to provide cyan image data and computing a feature measure for each tile based on a measure of colour and texture of the cyan image data and such data's Sobel filtered equivalent.

Selection from the prior subset of a further subset of tiles may be implemented by selecting tiles exhibiting differences between feature measures and tile overlap larger in magnitude (ignoring sign) than unselected equivalents.

In another aspect, the present invention provides apparatus for automated selection of tiles in an overall image, the apparatus comprising:
a) means for generating a computed image from at least one of a co-occurrence matrix of the overall image and an entropy image of the overall image, the computed image distinguishing between tiles on the basis of whether they are relatively more or relatively less likely to exhibit a property of interest;
b) means for selecting a prior subset of the tiles which are relatively more likely to exhibit the property of interest;
c) means for deriving a feature measure associated with at least one of colour and texture for tiles in the prior subset; and
d) means for selecting from the prior subset a further subset of tiles at least partly on the basis of tile feature measures.

The means for selecting from the prior subset a further subset of tiles may be arranged to avoid excessive tile overlap. The means for generating a computed image may use a combination of the co-occurrence matrix, the entropy image and a vignette mask arranged to exclude from the computed image outer regions of the overall image having low illumination relative to inner regions.

The means for generating a computed image may employ thresholding of the co-occurrence matrix and the entropy image to render them binary. The overall image may be a red, green and blue (R, G, B) image and the means for generating a computed image may derive the computed image from a green plane of the overall image.

A computed image may be generated by means using at least the co-occurrence matrix of the overall image and applying morphological closing operations to the computed image for spatial filtering of both tile regions containing image features of interest (foreground) and tile regions lacking such features (background).

Selection of prior and further subsets of tiles may be implemented by means using random procedures.

The apparatus of the invention may be used for cancer grading: it may be arranged to apply a Hue/Saturation/Value transformation to image data, threshold Hue and Saturation components to obtain areas of 'light pink', 'dark pink' and 'white' tissue, and compute a feature measure for each tile based on colour and texture.

The apparatus of the invention may alternatively be used for steroid/protein expression analysis: it may be arranged to transform image data to provide cyan image data and compute a feature measure for each tile based on a measure of colour and texture of the cyan image data and such data's Sobel filtered equivalent.

Selection from the prior subset a further subset of tiles may be implemented by means for selecting tiles exhibiting differences between feature measures and tile overlap larger in magnitude (ignoring sign) than unselected equivalents.

In a further aspect, the present invention provides computer software for use in automated selection of tiles in an overall image, the software incorporating instructions for controlling computer apparatus to carry out the steps of:

a) generating a computed image from at least one of a co-occurrence matrix of the overall image and an entropy image of the overall image, the computed image distinguishing between tiles on the basis of whether they are relatively more or relatively less likely to exhibit a property of interest;
b) selecting a prior subset of the tiles which are relatively more likely to exhibit the property of interest;
c) for tiles in the prior subset, deriving a feature measure associated with at least one of colour and texture; and
d) selecting from the prior subset a further subset of tiles at least partly on the basis of tile feature measures.

The software of the invention may have instructions for generating the computed image by thresholding of the co-occurrence matrix and the entropy image to render them binary. The overall image may be a red, green and blue (R, G, B) image and the software may have instructions for generating the computed image from a green plane of the overall image.

The software may have instructions for generating the computed image using at least the co-occurrence matrix of the overall image and applying morphological closing operations to the computed image for spatial filtering of both tile regions containing image features of interest (foreground) and tile regions lacking such features (background).

Selection of prior and further subsets of tiles may be implemented by random procedures.

The software of the invention may be used in connection with cancer grading: it may include instructions for applying a Hue/Saturation/Value transformation to image data, thresholding Hue and Saturation components to obtain areas of 'light pink', 'dark pink' and 'white' tissue and computing a feature measure for each tile based on colour and texture.

The software of the invention may alternatively be used for steroid/protein expression analysis: it may include instructions for transforming image data to provide cyan image data and computing a feature measure for each tile based on a measure of colour and texture of the cyan image data and such data's Sobel filtered equivalent.

Selection from the prior subset a further subset of tiles may be implemented by means of instructions in the software to implement selection of tiles exhibiting differences between feature measures and tile overlap larger in magnitude (ignoring sign) than unselected equivalents.

DESCRIPTION OF FIGURES

In order that the invention might be more fully understood, embodiments thereof will now be described, by way of example only, with reference to the accompanying drawings, in which:

FIG. 1 is a schematic drawing of a low magnification image of a microscope slide bearing a tissue sample comprising a section of a core biopsy and indicating selection of regions of tissue for further assessment;

FIG. 2 is a block diagram of a process of the invention;

FIG. 3 is a block diagram illustrating in more detail a process implementing a step in FIG. 2;

FIG. 4 schematically illustrates a hue histogram obtained in a colour image conversion step of FIG. 3; and FIG. 5 illustrates a random selection process used in the process illustrated in FIG. 3.

DESCRIPTION OF PREFERRED EMBODIMENTS

Referring to FIG. 1, a microscope slide image with low magnification indicated generally by 2 contains core biopsy specimen tissue 4. Rectangular image regions such as 6 are identified as being potentially suitable for determination of a histological parameter. The regions 6 are referred to as tissue tiles or just tiles, and will later be further magnified for histology purposes. The objective of the selection process is to select tiles 6 which are images of relatively highly textured and stained sections of core biopsy, and which are thereby more likely to show features of interest than sections which are relatively less textured and stained.

In a prior art manual procedure for selecting tiles, a clinician places a slide 2 under a microscope and examines it at a combination of magnifications from low (e.g. 2.5×) through to high (e.g. 40×). The clinician then seeks to identify by eye regions of tissue or tiles 6 that contain unusual colour, size, shape and boundary definition, a subjective procedure. The tiles 6 chosen in this way are then used for more detailed analysis leading to determination of one or more histological parameters. The process for choosing tiles hereinafter described in this example replaces the prior art manual procedure with an automated procedure.

FIG. 2 is an outline of a procedure 10 for automated selection of tissue tiles for histological assessment. Sections are taken (cut) from tissue samples (biopsies) and placed on respective microscope slides. These slides are stained using a staining agent selected according to which histological parameter is relevant, in this example breast cancer grading or protein expression analysis. Particular staining agents and their uses are as follows:

a) haematoxylin & eosin (H&E), which is a common stain for delineating tissue and cellular structure. Tissue stained with H&E is used to assess breast cancer grading, which includes mitotic activity, nuclear pleomorphism and tubule activity;

b) immunohistochemical staining for C-erb-2 with diaminobenzidine (DAB) as substrate (chemical staining agent)—collectively "Cerb-DAB"—this is for assessing protein over-expression and C-erb-2 gene amplification status; and c) oestrogen receptor (ER) with DAB as substrate (collectively "ER-DAB") for assessing the expression (the amount expressed or emitted) of the oestrogen receptors. Progesterone receptor (PR) status is investigated using chemical treatment giving the same colouration as in ER.

Each stained slide is scanned at 12 using an automated slide scanner which produces a digital image in three colours, red, green and blue (R, G & B). Three intensity values are obtained for each pixel in a pixel array to provide an image consisting of a combination of R, G and B image planes. A low resolution version (magnification by e.g. 2.5 times linear dimensions or 2.5×) of this digital image is analysed in order to select a set of tiles at 14: the selected tiles are then imaged at higher magnification and at 16 are entered into a database for further processing. For assessment of mitosis, pleomorphism, oestrogen receptor (ER), progesterone receptor (PR) and C-erb-2, full resolution or maximum microscope magnification is currently 40× and for tubules it is 10×. The number of tiles making up a chosen set of tiles is dependent upon what is being assessed and upon current medical practice; for mitosis it also depends on microscope field diameter. At the present time, ten tiles are chosen for mitosis, two for pleomorphism, two for tubules and one each for ER, PR and C-erb-2. However numbers of tiles in sets of tiles is a matter of choice and not critical to the invention.

Referring now to FIG. 3, step 14 of the procedure 10 described with reference to FIG. 2 is shown in more detail. At 20, from the green plane G of the input RGB image a grey level co-occurrence matrix is generated. It is not essential to use the green plane, but experience indicates that this yields better results. Creation of a grey level co-occurrence matrix is a standard image processing procedure described e.g. in IEEE Trans. Syst., Man, Cybern., Vol SMC-3, pp 610-621, 1973 (*Texture Features for Image Classification*, R M Haralick, K Shanmugan and I Dinstein). Such a matrix is a multidimensional histogram having matrix elements each of which is a frequency with which prearranged image properties co-occur. The input RGB image is firstly subsampled to $1/16^{th}$ of its original linear dimensions ($1/36^{th}$ area): pixel values in this subsampled image are then quantized down from 256 grey levels to 8 to reduce subsequent computation, i.e. pixel values 0 to 31 are set to zero, 32 to 63 are set to 1 and so on up to 224 to 255 being set to 7. A grey level co-occurrence matrix is then computed: this is an 8×8 matrix instead of 256×256 which would have resulted without quantization. In the present example, the co-occurrence matrix has a general or $i,j^{th}$ element (row i, column j) which is the number of times that grey levels i and j occur in two pixels separated by a specified distance in one or more prearranged directions. Here the distance is taken to be 1 pixel and the directions are a set of four, i.e. above, below, to the left and to the right of a current pixel under consideration: these are the current pixel's row and column (but not diagonal) nearest neighbours.

At 22, elements in the co-occurrence matrix are assessed and the element of maximum value together with its row position are determined: the row position indicates the quantized grey level at that position, and it is multiplied by 32 (i.e. 256/8) to convert its grey level value to a value in the original pre-quantization range of 0 to 255. The converted value is then used to define a threshold for production of a binary mask (pixel values 1 and 0 only) as follows. The binary mask has pixel values which are all 0 (background, no tissue) for pixels located in equivalent positions to pixels in the input image green plane G having values above the converted value threshold; all other pixel values in the binary mask are set to 1 (foreground, tissue).

Also at 22, morphological closing is then applied to clean up the binary mask. Morphological closing is not essential but improves results by spatially filtering out unwanted image structure. It is a standard image processing technique based on shape and geometry and published in Umbaugh S.C., 'Colour Vision and Image Processing', Prentice Hall, 1998. It applies a filter of some size and shape to an image to produce dilation (expansion) or erosion (shrinkage) of an image feature and remove concavities and convexities. A morphological closing operation is defined as dilation followed by erosion. Morphological operations are applied to an image by moving a filter kernel across the image one pixel position at a time. In the present example a 3×3 filter kernel (nine elements) is used which is an approximation to a circle as shown in Equation (1) below.

$$\text{Filter Kernel} = \begin{matrix} 0 & 1 & 0 \\ 1 & 1 & 1 \\ 0 & 1 & 0 \end{matrix} \quad (1)$$

The filter kernel conceptually overlies nine image pixels at a time, and conveniently begins in the top left hand corner of an image with pixels in the first three rows of the first three columns. To produce dilation, if any one or more of the four image pixels that are overlain by non-zero filter kernel elements have the value 1, the filter output is set to 1: this corresponds to a summation being performed using an OR operation. The filter kernel is then moved one pixel to the right and the process repeated. When the right hand side of an image is reached, the filter kernel is then moved one pixel down and the process is iterated until the entire image has been processed in this way. Erosion is the dual of dilation: here if any one or more of the four image pixels that are overlain by non-zero filter kernel elements have the value 0 the filter output is set to 0: this corresponds to a summation being performed using an AND operation. Erosion is repeated for the entire image in the same way as dilation.

The processed image resulting from the morphological closing operation is then inverted by subtracting each of its elements from 1; thus background pixels become 1 and foreground pixels become 0. The same morphological closing operation is repeated and the new result is inverted to return to the original form, i.e. background pixels become 0 and foreground pixels become 1. These two stages have the effect of reducing holes present in both background and foreground, and the image resulting from them is referred to as mask A.

At 24, from the green plane G of the original input RGB image, an entropy image is computed. Entropy is a measure of randomness, and it is greater for more randomly distributed pixel values. Homogenous image areas (such as images of areas of blank glass slide with no tissue) tend to have lower entropy than more highly textured areas of tissue. The image is firstly sub-sampled to $1/6^{th}$ of its original linear dimensions (e.g. 1476 by 1160 pixels sub-sampled down to 246 by 193) and the entropy is computed (as described below) for a window of 7×7 pixels in the image. This window is scanned across the image one pixel position at a time with entropy being computed at each position. When the window has been scanned completely across the image, it is moved down one pixel position and scanned across the image once more. This procedure is iterated until the whole image has been scanned in this way.

At each pixel position a histogram is obtained showing frequency of pixel intensities: with an image having 8-bit pixels for example, the histogram has an abscissa axis with 256 intensity values, 0 to 255, and an ordinate axis of the number of pixels having each intensity value. Thus the histogram is treated as a vector having 256 elements, and this vector has a general or $i^{th}$ unnormalised element $u_i$ (i=0 to 255) which is the number of pixels having intensity i. The histogram is then normalized by division of each unnormalised element $u_i$ by the sum of the histogram's unnormalised elements $u_i$, i.e. by the sum $$\sum_{i=0}^{255} u_i :$$

this converts each $u_i$ to a respective normalised element $h_i$, and entropy E is then computed from Equation (2).

$$E = \sum_{i=0}^{255} h_i \log_{10} h_i \qquad (2)$$

Once the window has been moved across and down the entire image and a complete set of entropy measures has been made, an entropy image results which is thresholded to produce an entropy mask. If an entropy image pixel is greater than a threshold such as 1.0, then the mask is set to a foreground value of 1; entropy image pixels not greater than the threshold are set to a background value of 0. During this process both the entropy image and the entropy mask are up-sampled to the original full image size, i.e. that prior to sub-sampling. The entropy mask is now referred to as mask B.

A microscope used to obtain images of slides provides image illumination which can be variable with a central image region having more brightness than outer image regions: from experimentation it was observed that this variation can in the extreme be from 35%-50%, with the illumination reducing considerably towards the four corners of the slide. This problem is ameliorated at stage 26 by creating an elliptical image mask V to act as a vignette to restrict image processing to prearranged areas. Pixels of the vignette mask V are computed from $v_{xy}$ values using Equation (3).

$$v_{xy} = \frac{x^2}{r_1^2} + \frac{y^2}{r_2^2} \qquad (3)$$

where x and y are Cartesian pixel coordinate positions relative to an origin (0,0) at the centre of the image and $r_1$ and $r_2$ are the semi-major and semi-minor axes of the elliptical mask V: these axes are conveniently set to be 42.5% of corresponding rectangular image height and width dimensions prior to vignetting, which means at least the outermost 15% of each image linear dimension is omitted from processing. All parameters on the right hand side of Equation (3) are expressed in numbers of pixels. If Equation (3) yields a $v_{xy}$ value less than or equal 1, then the elliptical mask V pixel at position (x, y) is set to 1 indicating foreground; if Equation (3) yields a $v_{xy}$ value greater than 1, the elliptical mask V pixel at position (x, y) is set to 0 indicating background: this mask is later referred to as mask C.

At 28 the grey level co-occurrence, entropy and elliptical vignette masks A, B and C respectively are combined into a single mask D using logical operations as set out in Equation (4).

$$D = C^{\wedge}(A \vee B) \qquad (4)$$

where ^ means the logical AND function and v means the logical OR function. It is not in fact essential to use this combination of masks A, B and C: C could be omitted and either A or B used alone instead of D. However, experience shows that results are improved if masks A, B and C are generated and combined for use in tile selection.

The mask D is used to indicate regions of a slide for histopathological analysis: it defines areas of the slide which contain tissue acceptable for pathology purposes. As shown in Equation (4), a logical OR is applied between masks A and B: this reflects the fact that the grey level co-occurrence and entropy techniques can both independently indicate slide regions of potential interest which should be considered. Consequently, if a pixel in either A or B is 1, a resulting pixel should be 1. The outcome of A ORed with B is then logically ANDed with mask C: this provides for consideration to be restricted to regions within the elliptical vignette expressed by mask C.

At 30 a procedure for selection of tiles is adopted which generates a set of tiles randomly chosen from within the vignetted area C of the original RGB image. A random procedure is not essential, but has been found from experience to be more robust against artifacts as compared to selection from prearranged locations or on the basis of regular spacing. The random procedure generates a fairly large set of tiles from which a much smaller set will subsequently be selected on the basis of criteria to be described later. The number of tiles initially chosen is not critical: by experiment, suitable numbers of tiles have been found to be 175 for mitosis, 70 for tubules and 125 for each of C-erb-2, ER and PR. Tiles for pleomorphism are chosen from a final set of tiles selected for mitosis as described later.

The random choice procedure generates a set of pairs (x, y) of random numbers each in the range 0 to 1 which are then scaled according to the relevant image dimensions, i.e. multiplied by the number of pixels across (x) or down (y) the image. Each pair (x, y) is regarded as the centre of a tile at position (x, y) in the image. The random choice procedure iterates until a prearranged number of pairs are chosen. This process ensures that pairs chosen adhere to specified criteria: the pairs should represent a reasonable distribution and not be too close to the edge of the image or overlap one another too much, although limited overlap (20%) between tiles is initially allowed. In prior art manual selection up to 60% tile overlap can occur. Any pair (x, y) which fails to meet a set of criteria when compared with those already generated is rejected as unsuitable; the criteria are set out in Equations (5) as follows:

$$\sqrt{(t_{x_i} - x)^2 + (t_{y_i} - y)^2} < \frac{\sqrt{w^2 + h^2}}{5} \qquad (5)$$

$$x \leq \frac{h}{2}$$

$$y \leq \frac{w}{2}$$

-continued $$x \geq H - \frac{h}{2}$$

$$y \geq W - \frac{w}{2}$$

$$\frac{\left(x - \frac{H}{2}\right)^2}{r_1^2} + \frac{\left(y - \frac{W}{2}\right)^2}{r_2^2} \geq 1$$

In Equations (5), x and y are a pair of randomly generated numbers, $t_{x_i}$ and $t_{y_i}$ are the $i^{th}$ pair of the set of current accepted random numbers, w is the required width of a tile, h is the required height of a tile, W is the width of the input image, H is the height of the input image, and $r_1$ and $r_2$ are the semi-major and semi-minor axes of the elliptical vignette mask C. The output at the end of this process will be a set of pairs of co-ordinates (x, y) which mark the centres of tiles selected as potentially suitable for histological assessment.

At 32 the process 14 branches depending upon whether breast cancer grading or protein expression analysis is being undertaken: other specific histopathological analysis processes could be introduced in parallel with subsequent steps 34 to 42 in order to compute different sets of relevant feature measures and thus enable the process 14 to cover other applications.

For breast cancer grading, at 34 the original RGB image is transformed from red/green/blue to a different image space hue/saturation/value HSV. One could restrict this transformation to image data of tiles currently selected: however, a large number of tiles has been selected some of which may be overlapping and requiring transformation of at least partly the same data. Consequently it is not necessarily gainful to restrict transformation to tiles, and in this example the whole of the original RGB image is transformed.

The RGB to HSV transformation is not essential, no transformation or a different transformation could be used, but RGB to HSV improves results by giving more emphasis to more important image features. It is described by K. Jack in 'Video Demystified', $2^{nd}$ ed., HighText Publications, San Diego, 1996. In practice value V (or brightness) is liable to be affected by variations in staining and thickness across a slide, as well as possible vignetting by a camera lens used to produce the images. In consequence in this example the V component is ignored: it is not calculated, and emphasis is placed on the hue (or colour) and saturation values H and S. H and S are calculated for each pixel of the two RGB images as follows:

Let M=maximum of (R,G,B), and (6)

Let m=minimum of (R,G,B); (7)

Then new$r$=(M−R)/(M−m), (8)

new$g$=(M−G)/(M−m), and (9)

new$b$=(M−B)/(M−m) (10)

Equations (8) to (10) convert each colour of a pixel into the difference between its magnitude and that of the maximum of the three colour magnitudes of that pixel, this difference being divided by the difference between the maximum and minimum of (R,G,B).

Saturation S is set as follows:

if M equals zero, S=0 (11)

if M does not equal zero, S=(M−m)/M (12)

The calculation for Hue (H) is as follows: from Equation (6), M must be equal to at least one of R, G and B:

if M equals zero, H=180 (13)

If M equals R, H=60(new$b$−new$g$) (14)

If M equals G, H=60(2+new$r$−new$b$) (15)

If M equals B, H=60(4+new$g$−new$r$) (16)

If H is greater than or equal 360, H=H−360 (17)

If H is less than 0, H=H+360 (18)

As has been said, Value V is not used in this example, but were it to be used it would be set to the maximum of (R,G,B).

A histogram is produced (as previously described) for hue H, the histogram being a vector with 360 values 0 to 359 shown schematically in FIG. 4. The histogram has two maxima, these being a light peak or maximum 70 in a low hue (0-179) region 72 of the histogram and a dark peak or maximum 74 in a high hue (180-359) region 76. The positions or hue values at which the light peak 70 and the dark peak 74 occur are located, in this example by searching outward from a prearranged hue position (250 chosen by experimentation): they are recorded as the 'light peak position' and 'dark peak position'. In addition to this the positions 78 and 80 of the dark peak's start and finish positions are recorded. These are obtained because the original RGB image may not occupy all 360 degrees of the hue range. If the absolute value of the upper part's dark peak finish position minus the dark peak position is less than 12 the hue histogram is considered to be skewed towards 360 degrees, and then quantities $r_{min}$ and $r_{max}$ defined in Equations (19) and (20) below are computed.

$r_{min}$=0.8(dark peak position) (19)

$r_{max}$=$r_{min}$+0.9(dark peak position−$r_{min}$)

i.e. $r_{max}$=0.98(dark peak position) (20)

If the absolute value of the upper part's dark peak finish position minus the dark peak position is not less than 12, then $r_{min}$ and $r_{max}$ are as defined in Equations (21) and (22) below and are computed:

$r_{min}$=dark peak start position (21)

$r_{max}$=$r_{min}$+(dark peak finish position−dark peak position)+0.75(dark peak finish position−dark peak position) (22)

In Equations (19) to (22), $r_{min}$ is a range minimum and $r_{max}$ is a range maximum. Using this range information and together with hue and saturation values three new masks are created which approximately correspond to 'light pink', 'dark pink' and 'white' portions of the original input (RGB) image. These new masks are created using respective conditions in Equations (23) below, i.e.:

$lp = (h > r_{max} \vee h < 360) \vee (h > 0 \vee h < 40) \vee (s < 0.5)$ $dp = (h > r_{min} \vee h \leq r_{max} \vee s < 0.5)$ $wt = (h > 40 \vee h < 80 \vee s < 0.2)$ (23)

where h is the hue image, s is the saturation image, lp is light pink, dp is dark pink and wt is white: if the respective condition for lp, dp or wt is satisfied, then lp, dp or wt as appropriate is set to 1, or to 0 if unsatisfied. This operation carried out on a pixel by pixel basis across the images using pairs of like-located ($i^{th}$) pixels in images h and s.

At 36 a measure $f_m$ of an image feature relevant to breast cancer is computed for each of the tiles selected at step 30; this computation uses Equations (24) below:

$$f_m = w_1 E + w_2 C_g \qquad (24)$$

$$C_g = \frac{C_1}{\alpha} + \frac{C_2}{\beta} + \left(1 - \frac{C_3}{\delta}\right)$$

$$C_1 = \frac{1}{\sigma_1 \sqrt{2\pi}} e^{-\frac{(x-\mu_1)^2}{2\sigma_1^2}}$$

$$C_2 = \frac{1}{\sigma_2 \sqrt{2\pi}} e^{-\frac{(y-\mu_2)^2}{2\sigma_2^2}}$$

$$C_3 = \frac{1}{\sigma_3 \sqrt{2\pi}} e^{-\frac{(z-\mu_3)^2}{2\sigma_3^2}}$$

$$x = \frac{\sum lp}{A}$$

$$y = \frac{\sum wt}{A}$$

$$z = \frac{\sum dp}{A}$$

where E is the entropy computed using Equation (2) and averaged over all data points within the current tile; $\Sigma lp$, $\Sigma dp$ and $\Sigma wt$ are summations over pixels in the light pink, dark pink and white images respectively, each image having area A expressed as a number of pixels: consequently x, y and z represent respective percentages of components lp, wt and dp present within a current tile being assessed.

Other parameters in Equations (24) are as follows: $\mu_1$, $\mu_2$ and $\mu_3$ are set to 0, $\sigma_1$=0.25, $\sigma_2$=0.2, $\sigma_3$=0.1, $w_1$=0.7 and $w_2$=0.3; $\alpha$, $\beta$ and $\delta$ are scaling factors on respective Gaussian functions $C_1$, $C_2$ and $C_3$ and are chosen to ensure that the maximum function value in each case is 1.0, i.e. $\alpha$=1.595, $\beta$=1.994 and $\delta$=3.989. If for the current tile a percentage greater than 25% is determined for background points from a corresponding section of the combined mask D produced at step 28 in FIG. 3, then the feature measure $f_m$ is set to zero because it is considered that for example the tile does not represent tissue sufficiently, i.e. it may extend over the edge of a piece of tissue.

Turning now to the other branch 38 to 42 in FIG. 3 relating to steroid or protein analysis, at 38 the original RGB image is used to compute a cyan image derived from the blue and green image planes: i.e. for each pixel a cyan intensity C is computed from C=(2×B+G)/3, the respective pixel's green (G) intensity being added to twice its blue (B) intensity and the resulting sum being divided by three. When repeated for all pixels this yields a cyan image or image plane. Cyan is used because it is a complementary colour to brown, which is a cell boundary colour produced by conventional chemical staining of a specimen. The blue image plane could be used instead but does not normally produce results as good as the cyan image. If a different colour staining were to be use, the associated complementary colour image would preferably be selected. A Sobel edge filter is then applied to the cyan image plane: this is a standard image processing technique published in Klette R., & Zamperoni P., 'Handbook of image processing operators', John Wiley & Sons, 1995.

Similarly to the situation described in relation to cancer grading, one could restrict the above cyan/Sobel of cyan transformations to image data of tiles currently selected: however, it is not necessarily gainful so to do, and in this example the whole of the original RGB image is transformed.

A Sobel edge filter is applied at 40; this consists of two 3×3 arrays of numbers $S_P$ and $S_Q$, each of which is convolved with successive 3×3 arrays of pixels in an image. Here $$S_P = \begin{bmatrix} 1 & 2 & 1 \\ 0 & 0 & 0 \\ -1 & -2 & -1 \end{bmatrix} \text{ and } S_Q = \begin{bmatrix} 1 & 0 & -1 \\ 2 & 0 & -2 \\ 1 & 0 & -1 \end{bmatrix} \qquad (25)$$

The step 40 initially selects a first cyan 3×3 array of pixels in the top left hand corner of the cyan image: designating as $C_{ij}$ a general cyan pixel in row i and column j, the top left hand corner of the image consists of pixels $C_{11}$ to $C_{13}$, $C_{21}$ to $C_{23}$ and $C_{31}$ to $C_{33}$. $C_{ij}$ is then multiplied by the respective digit of $S_p$ located in the $S_p$ array as $C_{ij}$ is in the 3×3 cyan pixel array: i.e. $C_{11}$ to $C_{13}$ are multiplied by 1, 2 and 1 respectively, $C_{21}$ to $C_{23}$ by zeroes and $C_{31}$ to $C_{33}$ by −1, −2 and −1 respectively. The products so formed are added algebraically and provide a value p.

The value of p will be relatively low for pixel values changing slowly between the first and third rows either side of the row of $C_{22}$, and relatively high for pixel values changing rapidly between those rows: in consequence p provides an indication of image edge sharpness across rows. This procedure is repeated using the same pixel array but with $S_Q$ replacing $S_p$, and a value q is obtained: q is relatively low for pixel values changing slowly between the first and third columns either side of the column of $C_{22}$, and relatively high for pixel values changing rapidly between those columns: and q therefore provides an indication of image edge sharpness across columns. The square root of the sum of the squares of p and q are then computed i.e. $\sqrt{p^2+q^2}$, which is defined as an "edge magnitude" and becomes $T_{22}$ (replacing pixel $C_{22}$ at the centre of the 3×3 array) in the transformed cyan image. It is also possible to derive an edge "phase angle" as $\tan^{-1} p/q$, but that is not required in the present example.

A general pixel $T_{ij}$ (i.e. at row i, column j) in the transformed image is derived from $C_{i-1,j-1}$ to $C_{i-1,j+1}$, $C_{i,j-1}$ to $C_{i,j+1}$ and $C_{i+1,j+1}$ of the cyan image. Because the central row and column of the Sobel filters in Equation (25) respectively are zeros, and other coefficients are 1s and 2s, p and q for $T_{ij}$ can be calculated as follows:

$$p = \{C_{i-1,j-1} + 2C_{i-1,j} + C_{i-1,j+1}\} - \{C_{i+1,j-1} + 2C_{i+1,j}C_{i+1,j+1}\} \qquad (26)$$

$$q = \{C_{i-1,j-1} + 2C_{i,j-1} + C_{i+1,j-1}\} - \{C_{i-1,j+1} + 2C_{ij+1}C_{i+1,j+1}\} \qquad (27)$$

Beginning with j=j=2, p and q are calculated for successive 3×3 pixel arrays by incrementing j by 1 and evaluating Equations (26) and (27) for each such array until the end of a row is reached; j is then incremented by 1 and the procedure is repeated for a second row and so on until the whole image has been transformed. This transformed image is referred to below as the "Sobel of Cyan" image or image plane.

The Sobel filter cannot calculate values for pixels at image edges having no adjacent pixels on one or other of its sides: i.e. in a pixel array having N rows and M columns, edge pixels are the top and bottom rows and the first and last columns, or in the transformed image pixels $T_{11}$ to $T_{1M}$, $T_{N1}$ to $T_{NM}$, $T_{11}$ to $T_{1N}$ and $T_{1M}$ to $T_{NM}$. By convention in Sobel filtering these edge pixels are set to zero.

At 42 a respective feature measure $f_m$ for steroid or protein analysis is computed for each of the tiles selected at step 30 in FIG. 3 according to Equations (28) below.

$$f_m = E + C_{pe} \quad (28)$$

$$C_{pe} = \frac{\sum (c_j < T_1 \wedge ce_j > T_2)}{A}$$

$$T_1 = \mu_c - 2\sigma_c$$

$$T_2 = \mu_{ce} + 2\sigma_{ce}$$

where E is the entropy computed using Equation (2) and averaged over all pixels within a current tile being assessed, A is the tile area (number of pixels in the current tile), c and ce are the cyan and Sobel of cyan images with general or jth pixels $c_j$ and $ce_j$ respectively, $\mu_c$ and $\mu_{ce}$ are the means of the cyan and Sobel of cyan images respectively, and $\sigma_c$ and $\sigma_{ce}$ are the standard deviations of those images respectively. The expression for $C_{pe}$ means that for each tile in turn, i.e. the current tile in each case, all the relevant like-located or jth pixels $c_j$ and $ce_j$ in the cyan and Sobel of cyan images c and ce of that tile are compared with the respective thresholds $T_1$ and $T_2$: each $c_j$ less than $T_1$ is logically ANDed with each $ce_j$ greater than $T_2$ where available, and the results of the AND operations for each tile are summed. The result of the summation operation is then divided by tile area A to provide $C_{pe}$, a contribution towards the feature measure for the current tile. This is repeated for all tiles presently selected.

The means and standard deviations are computed as follows. For convenience a change of nomenclature is implemented: a single pixel index k is substituted for i and j, i.e. k=1 to NM for i, j=1, 1 to N, M: where N and M are the original image dimensions; this treats a two dimensional image as a single composite line composed of successive rows of the image. Equations (29a) to (30b) below are used for computing the means $\mu_c$ and $\mu_{ce}$ and standard deviations $\sigma_c$ and $\sigma_{ce}$ of the pixels $x_k$ and $x_{ke}$ in the cyan and Sobel of cyan images.

$$\mu_c = \frac{1}{NM} \sum_{k=1}^{NM} x_k \quad (29a)$$

$$\sigma_c = \sqrt{\frac{1}{NM-1} \sum_{k=1}^{NM} (x_k - \mu)^2} \quad (29b)$$

$$\mu_{ce} = \frac{1}{NM} \sum_{k=1}^{NM} x_{ke} \quad (30a)$$

$$\sigma_{ce} = \sqrt{\frac{1}{NM-1} \sum_{k=1}^{NM} (x_{ke} - \mu)^2} \quad (30b)$$

At this point one either has a set of cancer grading feature measures derived at 36 or alternatively a set of steroid/protein expression analysis feature measures derived at 42, depending upon which of the loops 34-36 or 38-42 has been implemented. There is one respective feature measure for each tile assessed. In either case, the derived set of feature measures is treated as a vector having entries (vector elements) each of which is a feature measure for a respective tile. At 44 these vector elements are sorted using what is referred to as "Quicksort" (although any sorting technique could be used). Quicksort is a known technique published by Klette R., Zamperoniu P., 'Handbook of Image Processing Operators', John Wiley & Sons, 1996, and will not be described. The sorted vector element feature measures are then ranked in descending order of magnitude so that the maximum value occurs first. Sorting and ranking are not essential but convenient.

At 46 a cumulative distribution function vector c is derived having vector elements which are respective sorted and ranked feature measures. The cumulative distribution function vector c is one having vector elements that are monotonically increasing: however, as the feature measures have been sorted and ranked, this vector is computed so that its elements are monotonically decreasing with its lowest numbered element $c_1$ having greatest value. It is thus evaluated in reverse: a final vector entry or vector element $c_n$ of the cumulative distribution function vector c is set equal to a final element $f_{mn}$ of the sorted and ranked vector of feature measures. Each successive element $c_i$ (i=n-1 to 1) of the cumulative distribution function vector c is then set equal to the sum of its previous element $c_{i+1}$ and a current element $f_i$ of the sorted and ranked feature measure vector f, as shown in Equations (32):

$$c_n = f_{mn}$$

$$c_i = c_{i+1} + f_i \quad (32)$$

where n is the number of elements in the vectors and i=n-1, n-2, . . . , 1.

At 48 stochastic sampling is applied, a known technique developed for random selection in genetic algorithms, Goldberg D. E., 'Genetic Algorithms in Search, Optimisation and Machine Learning', Addison Wesley 1989. This technique is also referred to as roulette wheel selection as illustrated at 100 in the upper right of FIG. 5: conceptually individual slots such as 102 of the wheel are weighted according to their feature measures and thus those resulting in a larger slot have greater likelihood of being chosen during the selection process. To illustrate this with a simple example, if there were only three feature values with respective weights 0.2, 0.3 and 0.5, these would be assigned the intervals 0 to 0.2, 0.21 to 0.5 and 0.51 to 1, any value between 0.2 and 0.21 or 0.5 and 0.51 being rounded up. Thus interval length is proportional to weight. A random number generator selects a number between 0 and 1; the first, second or third value is selected according to whether the random number appears in the first, second or third interval. Thus selection is random but a feature measure of higher weight has a greater probability of being chosen.

A subset of the set of tiles currently being assessed is chosen at random, the subset having a higher probability of being suitable for histopathological measurement purposes compared to other tiles in the set. The number of tiles chosen at this stage is not critical. Here again random selection is not essential but it appears to improve results.

From experimentation the following numbers of tiles were chosen: twenty for mitosis, seven for tubules, five for C-erb-2, five for each of ER and PR; pleomorphism tiles are chosen from a final set of mitosis tiles as described later. A set of unique pseudo random numbers is generated using a standard library function: see Press W. H., Teukolsky S. A., Vetterling W. T., Flannery B. P., 'Numerical Recipies in C: the art of scientific computing', Cambridge University Press, 1992 and Knuth D. E., 'The Art of Computer Programming', vol. 2, Addison Wesley 1981. Generation of such numbers is by known techniques and will not be described further. The pseudo random numbers are generated in such a way that no two numbers are the same and generation is limited to ensure the generation process terminates: by experimentation this limit is set at 50 attempts.

Referring to FIG. 5 once more, the cumulative distribution function vector c is shown plotted as a curve 120 with its elements associated with respective tile number indices x previously allocated in descending order of vector element magnitude. Since each element of the cumulative distribution function vector c is a respective feature measure, and these elements are sorted in descending order with respect to tile index number x, the curve 120 is monotonically decreasing. Each pseudo random number chosen as described above is treated as a y-axis location: as indicated by arrows 122 and 124, it is used to index a point on the cumulative distribution curve 120 and the tile indicated by the tile number index or x-axis value for the point on the curve with that y-axis location is identified. At the end of the generation process a set of tile number indices is obtained which indicates a chosen subset of tiles.

At 50 the chosen subset of tiles are sorted according to their feature measures $f_m$ as described at stage 44 and are then ranked and given numerical indices in descending order of $f_m$ so that the maximum $f_m$ value occurs first. Sorting and ranking are not essential but convenient. At 52, for each of the tiles in the chosen subset, using Equations (33) an estimate is made of the amount of overlap $ov_i$ of a current tile with index no. i when compared with all other tiles j in the chosen subset:

$$ov_i = \frac{1}{hw} \sum_{i,j=1}^{N} s \quad (33)$$

$$d_1 = |x_c^i - x_c^j| \text{ and } d_2 = |y_c^i - y_c^j|$$

$$s = \begin{cases} (h-d_1)(w-d_2), & d_1 < h \wedge d_2 < w \\ 0, & \text{otherwise} \end{cases}$$

where $x_c^i$ is a coordinate of a centre of tile i in an x (height) direction, $x_c^j$ is a coordinate of a centre of tile j in that direction, $y_c^i$ is a coordinate of a centre of tile i in a y (width) second direction, $y_c^j$ is a coordinate of a centre of tile j in the second direction, h is the height of a tile, w is the width of a tile and N is the number of tiles in the chosen subset.

At 54 a new measure $F_i$ is obtained based on each tile's feature measure (from step 36 or 42) and overlap measurement (from step 52) using Equation (34):

$$F_i = -f_{mi} + ov_i \quad (34)$$

where $f_{mi}$ and $ov_i$ are the $i^{th}$ tile's feature measure and overlap measurement. The measure $F_i$ is computed for each of the chosen tiles from step 48 (e.g. twenty for mitosis, seven for tubules, and five for each of C-erb-2, ER and PR). It is desirable to maximize the feature measure and minimize the amount of overlap; it is not essential to minimize overlap as overlap between tiles can be tolerated, but it reduces redundancy in subsequent measurements of histological parameters. To maximize feature measure and minimize overlap, a minimum is derived for the combination of the negated feature measure $-f_{mi}$ with the positive overlap $+ov_i$ on the right hand side of Equation (34). In practice a set of minima is located, in the present example for mitosis ten from twenty were chosen, two from seven for tubules, and two from five for each of C-erb-2, ER and PR: for pleomorphism two were chosen from the twenty mitosis tiles. Automated selection of tiles in accordance with the invention for subsequent histological analysis by a pathologist or an automated technique is then complete. It is however emphasized that these numbers of minima result from experimentation, and the technique of the invention is equally valid for other numbers of tiles. The number of tiles chosen for mitosis for example is related to the field of view of the microscope used to obtain the tiles. More than ten mitosis tiles could be chosen as mentioned in 'Pathology Reporting of Breast Disease', NHSBSP Publication no 58, January 2005.

In the foregoing example, the numbers of files assessed by the automated procedure of the invention were 175 for mitosis, 70 for tubules and 125 for each of C-erb-2, ER and PR. The numbers of tiles finally selected for histological assessment were 10 for mitosis and 2 for each of tubules, C-erb-2, ER, PR and pleomorphism. These numbers of chosen tiles are very much smaller than the 256 non-overlapping tiles obtainable from the original overall slide image. This example of the invention achieved a reduction in the number of tiles down to less than 6% of those assessed, on average 2.9%, which greatly alleviates the histological assessment burden while at the same time ensuring a good sample of the available tiles is investigated.

Applications of the invention include:
a) tumours;
b) anomalies in different parts of cells such as cytoplasm or the nucleus or the stroma, necrosis, fibroblast, gland, duct, dermis, lymphocyte, fibre, lumen, elastic tissue; and
c) pharmaceuticals: use in drug discovery, ie identifying sections of tissue for further analysis; bio-marker and drug discovery for protein, steroid or other types of receptor.

The processes set out in the foregoing description can clearly be evaluated by appropriate computer software embodied in a carrier medium and running on a conventional computer system. Such software may be in the form of a product comprising a computer readable medium containing computer readable instructions for controlling operation of computer apparatus to implement automated selection of tiles in an overall image, the computer readable instructions providing a means for controlling the computer apparatus to carry out steps of processes previously described herein. Software of this nature is straightforward for a skilled programmer to implement without requiring invention, because the processes described are well known mathematical procedures. Such software and computer apparatus or computer system will therefore not be described further.

The invention claimed is:

1. A method for automated selection of image regions ("tiles") in an overall image, the method comprising:
   a) generating a computed image from at least one of a co-occurrence matrix of the overall image and an entropy image of the overall image, the computed image distinguishing between tiles on the basis of whether they are relatively more or relatively less likely to exhibit a property of interest;
   b) selecting a prior subset of the tiles which are relatively more likely to exhibit the property of interest;
   c) for tiles in the prior subset, deriving a feature measure associated with at least one of colour and texture; and
   d) selecting from the prior subset a further subset of tiles at least partly on the basis of tile feature measures and having regard to avoidance of excessive tile overlap.

2. A method for automated selection of image regions ("tiles") in an overall image, the method comprising:
   a) generating a computed image from at least one of a co-occurrence matrix of the overall image and an entropy image of the overall image, the computed image distinguishing between tiles on the basis of whether they are relatively more or relatively less likely to exhibit a property of interest;

b) selecting a prior subset of the tiles which are relatively more likely to exhibit the property of interest;

c) for tiles in the prior subset, deriving a feature measure associated with at least one of colour and texture; and d) selecting from the prior subset a further subset of tiles at least partly on the basis of tile feature measures wherein the step of generating a computed image uses a combination of the co-occurrence matrix, the entropy image and a vignette mask arranged to exclude from the computed image outer regions of the overall image having low illumination relative to inner regions.

3. A method according to claim 2 wherein the step of generating a computed image incorporates thresholding of the co-occurrence matrix and the entropy image to render them binary.

4. A method according to claim 1 wherein the overall image is a red, green and blue (R, G, B) image and the step of generating a computed image is implemented using a green plane of the overall image.

5. A method according to claim 1 wherein the step of generating a computed image employs at least the co-occurrence matrix of the overall image and incorporates applying morphological closing operations to the computed image for spatial filtering of both tile regions containing image features of interest (foreground) and tile regions lacking such features (background).

6. A method according to claim 1 wherein the step of selecting a prior subset is implemented by a random procedure.

7. A method according to claim 1 wherein the step of selecting from the prior subset a further subset of tiles is implemented by a random procedure.

8. A method for cancer grading comprising the automated selection of image regions ("tiles") in an overall image, the method comprising:

a) generating a computed image from at least one of a co-occurrence matrix of the overall image and an entropy image of the overall image, the computed image distinguishing between tiles on the basis of whether they are relatively more or relatively less likely to exhibit a property of interest;

b) selecting a prior subset of the tiles which are relatively more likely to exhibit the property of interest;

c) for tiles in the prior subset, deriving a feature measure associated with at least one of colour and texture; and d) selecting from the prior subset a further subset of tiles at least partly on the basis of tile feature measures;

the method further including the step of applying a Hue/Saturation/Value transformation to image data, thresholding Hue and Saturation components to obtain areas of 'light pink', 'dark pink' and 'white' tissue and computing a feature measure for each tile based on colour and texture.

9. A method for steroid/protein expression analysis comprising the automated selection of image regions ("tiles") in an overall image, the method comprising:

a) generating a computed image from at least one of a co-occurrence matrix of the overall image and an entropy image of the overall image, the computed image distinguishing between tiles on the basis of whether they are relatively more or relatively less likely to exhibit a property of interest;

b) selecting a prior subset of the tiles which are relatively more likely to exhibit the property of interest;

c) for tiles in the prior subset, deriving a feature measure associated with at least one of colour and texture; and d) selecting from the prior subset a further subset of tiles at least partly on the basis of tile feature measures, and further including the step of transforming image data to provide cyan image data and computing a feature measure for each tile based on a measure of colour and texture of the cyan image data and such data's Sobel filtered equivalent.

10. A method according to claim 1 wherein the step of selecting from the prior subset a further subset of tiles is implemented by selecting tiles exhibiting differences between feature measures and tile overlap larger in magnitude than unselected equivalents.

11. Apparatus for automated selection of tiles in an overall image, the apparatus comprising:

a) computer apparatus for generating a computed image from at least one of a co-occurrence matrix of the overall image and an entropy image of the overall image, the computed image distinguishing between tiles on the basis of whether they are relatively more or relatively less likely to exhibit a property of interest b) computer apparatus for selecting a prior subset of the tiles which are relatively more likely to exhibit the property of interest c) computer apparatus for deriving a feature measure associated with at least one of colour and texture for tiles in the prior subset and d) computer apparatus for selecting from the prior subset a further subset of tiles at least partly on the basis of tile feature measures wherein the means for selecting from the prior subset a further subset of tiles is arranged to avoid excessive tile overlap.

12. Apparatus for automated selection of tiles in an overall image, the apparatus comprising:

a) computer apparatus for generating a computed image from at least one of a co-occurrence matrix of the overall image and an entropy image of the overall image, the computed image distinguishing between tiles on the basis of whether they are relatively more or relatively less likely to exhibit a property of interest b) computer apparatus for selecting a prior subset of the tiles which are relatively more likely to exhibit the property of interest c) computer apparatus for deriving a feature measure associated with at least one of colour and texture for tiles in the prior subset and d) computer apparatus for selecting from the prior subset a further subset of tiles at least partly on the basis of tile feature measures wherein the means for generating a computed image uses a combination of the co-occurrence matrix, the entropy image and a vignette mask arranged to exclude from the computed image outer regions of the overall image having low illumination relative to inner regions.

13. Apparatus according to claim 12 wherein the means for generating a computed image implements thresholding of the co-occurrence matrix and the entropy image to render them binary.

14. Apparatus according to claim 11 wherein the overall image is a red, green and blue (R, G, B) image and the means for generating a computed image derives the computed image from a green plane of the overall image.

15. Apparatus according to claim 11 wherein the means for generating a computed image employs at least the co-occurrence matrix of the overall image and applies morphological closing operations to the computed image for spatial filtering of both tile regions containing image features of interest (foreground) and tile regions lacking such features (background).

16. Apparatus according to claim 11 wherein the means for selecting a prior subset employs a random selection procedure.

17. Apparatus according to claim 11 wherein the means for selecting from the prior subset a further subset of tiles employs a random selection procedure.

18. Apparatus according to claim 11 for cancer grading including means for applying a Hue/Saturation/Value transformation to image data, means for thresholding Hue and Saturation components to obtain areas of 'light pink', 'dark pink' and 'white' tissue and means for computing a feature measure for each tile based on colour and texture.

19. Apparatus according to claim 11 for steroid/protein expression analysis including means for transforming image data to provide cyan image data and means for computing a feature measure for each tile based on a measure of colour and texture of the cyan image data and such data's Sobel filtered equivalent.

20. Apparatus according to claim 11 including means for selecting from the prior subset a further subset of tiles by selecting tiles exhibiting differences between feature measures and tile overlap larger in magnitude than unselected equivalents.

21. A computer software product comprising a non-transitory computer readable medium containing computer readable instructions for controlling operation of computer apparatus to implement automated selection of tiles in an overall image, wherein the computer readable instructions provide a means for controlling the computer apparatus to carry out the steps of:
   a) generating a computed image from at least one of a co-occurrence matrix of the overall image and an entropy image of the overall image, the computed image distinguishing between tiles on the basis of whether they are relatively more or relatively less likely to exhibit a property of interest;
   b) selecting a prior subset of the tiles which are relatively more likely to exhibit the property of interest;
   c) for tiles in the prior subset, deriving a feature measure associated with at least one of colour and texture; and
   d) selecting from the prior subset a further subset of tiles at least partly on the basis of tile feature measures and further having instructions for implementing the step of selecting from the prior subset a further subset of tiles having regard to avoidance of excessive tile overlap.

22. A computer software product according to claim 21 having instructions for implementing the step of generating a computed image using a combination of the co-occurrence matrix, the entropy image and a vignette mask arranged to exclude from the computed image outer regions of the overall image having low illumination relative to inner regions.

23. A computer software product according to claim 22 having instructions for implementing the step of generating a computed image by thresholding of the co-occurrence matrix and the entropy image to render them binary.

24. A computer software product according to claim 21 wherein the overall image is a red, green and blue (R, G, B) image, the software having instructions for implementing the step of generating a computed image from a green plane of the overall image.

25. A computer software product according to claim 21 having instructions for implementing the step of generating a computed image using at least the co-occurrence matrix of the overall image and applying morphological closing operations to the computed image for spatial filtering of both tile regions containing image features of interest (foreground) and tile regions lacking such features (background).

26. A computer software product according to claim 21 having instructions for implementing the step of selecting a prior subset by a random procedure.

27. A computer software product according to claim 21 having instructions for implementing the step of selecting from the prior subset a further subset of tiles by a random procedure.

28. A computer software product for cancer grading comprising a non-transitory computer readable medium containing computer readable instructions for controlling operation of computer apparatus to implement automated selection of tiles in an overall image, wherein the computer readable instructions provide a means for controlling the computer apparatus to carry out the steps of:
   a) generating a computed image from at least one of a co-occurrence matrix of the overall image and an entropy image of the overall image, the computed image distinguishing between tiles on the basis of whether they are relatively more or relatively less likely to exhibit a property of interest;
   b) selecting a prior subset of the tiles which are relatively more likely to exhibit the property of interest;
   c) for tiles in the prior subset, deriving a feature measure associated with at least one of colour and texture; and
   d) selecting from the prior subset a further subset of tiles at least partly on the basis of tile feature measures and further having instructions for implementing the step of applying a Hue/Saturation/Value transformation to image data, thresholding Hue and Saturation components to obtain areas of 'light pink', 'dark pink' and 'white' tissue and computing a feature measure for each tile based on colour and texture.

29. A computer software product for steroid/protein expression analysis comprising a non-transitory computer readable medium containing computer readable instructions for controlling operation of computer apparatus to implement automated selection of tiles in an overall image, wherein the computer readable instructions provide a means for controlling the computer apparatus to carry out the steps of:
   a) generating a computed image from at least one of a co-occurrence matrix of the overall image and an entropy image of the overall image, the computed image distinguishing between tiles on the basis of whether they are relatively more or relatively less likely to exhibit a property of interest;
   b) selecting a prior subset of the tiles which are relatively more likely to exhibit the property of interest;
   c) for tiles in the prior subset, deriving a feature measure associated with at least one of colour and texture; and
   d) selecting from the prior subset a further subset of tiles at least partly on the basis of tile feature measures and further having instructions for implementing the step of transforming image data to provide cyan image data and computing a feature measure for each tile based on a measure of colour and texture of the cyan image data and such data's Sobel filtered equivalent.

30. A computer software product according to claim 21 having instructions for implementing the step of selecting from the prior subset a further subset of tiles by selecting tiles exhibiting differences between feature measures and tile overlap larger in magnitude than unselected equivalents.

* * * * *